Nov. 30, 1965    G. M. LEWIS ETAL    3,220,669
POWER PLANT MOUNTING

Filed March 25, 1964    4 Sheets-Sheet 1

Inventor
GORDON MANNS LEWIS
KENNETH WILLIAM CLARK

By Bailey, Stephenson
Huettig
Attorneys

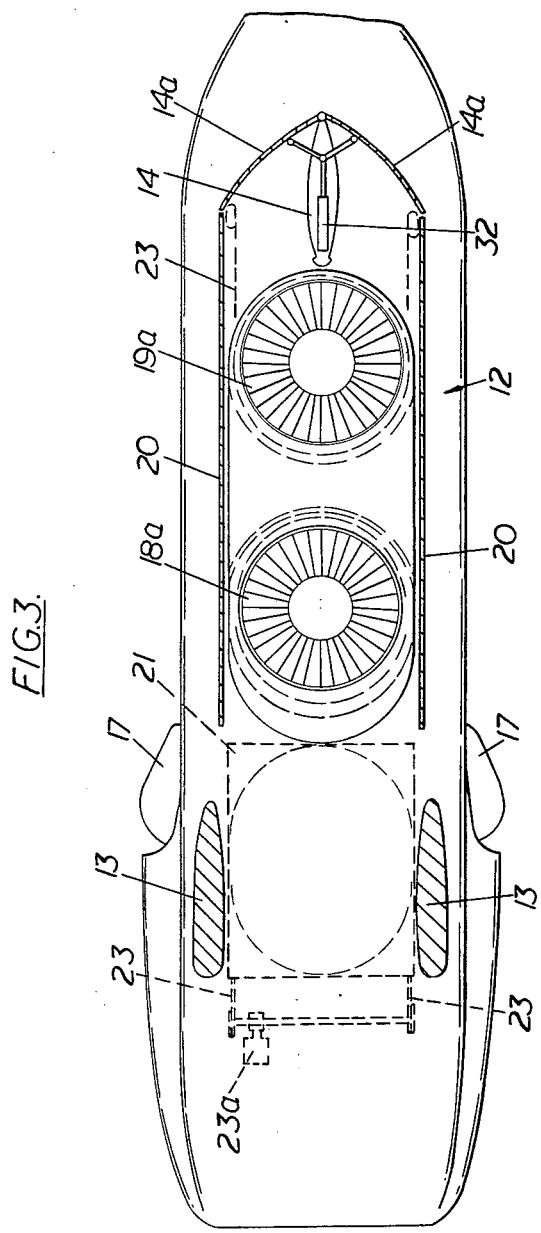

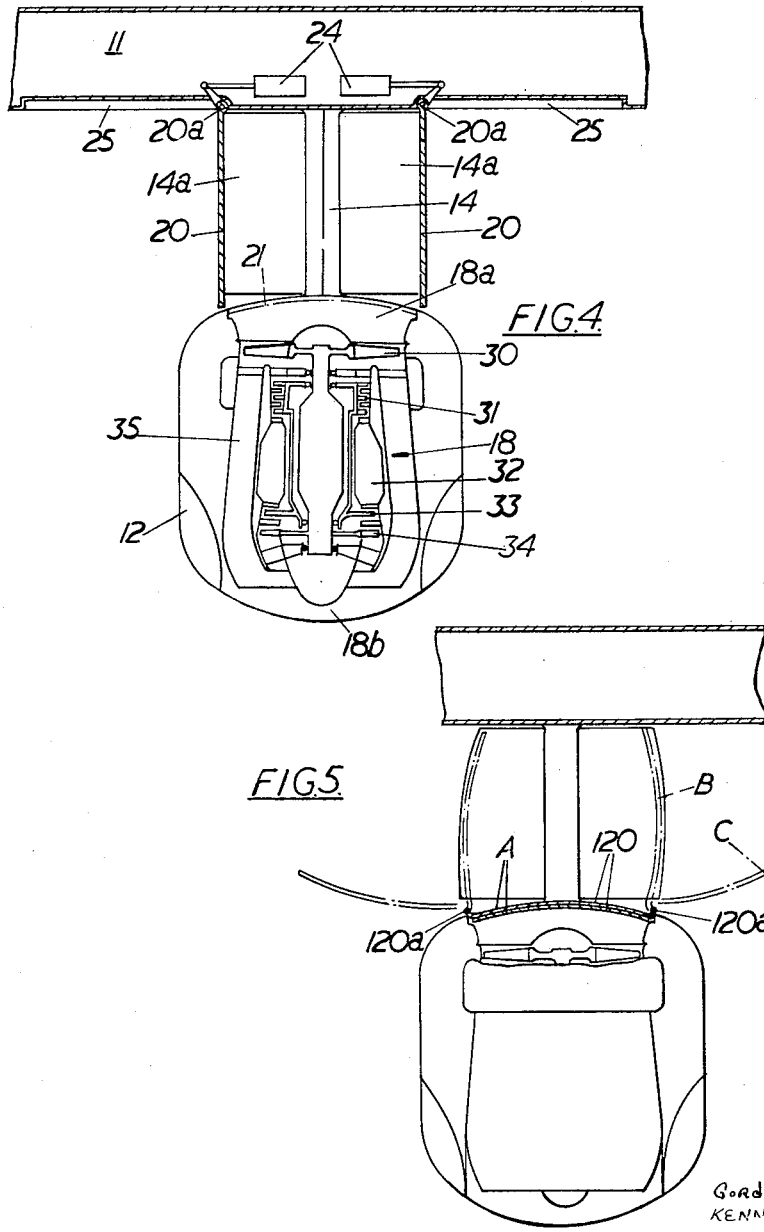

United States Patent Office 3,220,669
Patented Nov. 30, 1965

3,220,669
POWER PLANT MOUNTING
Gordon Manns Lewis and Kenneth William Clark, Bristol, England, assignors to Bristol Siddeley Engines Limited, Bristol, England, a British company
Filed Mar. 25, 1964, Ser. No. 354,709
Claims priority, application Great Britain, Mar. 26, 1963, 11,924/63
5 Claims. (Cl. 244—12)

This invention relates to aeroplanes which comprise an engine pod slung below a lifting surface, and housing one or more direct lift turbo jet engines for use during take-off and landing only, the pod having one or more engine air intake openings in part of its surface facing the lifting surface. Owing to the strong flow of air across the engine air intake openings during flight, difficulty is experienced in starting the engines in these conditions preparatory to landing.

According to this invention, such an aircraft is provided with means, at least partly retractable, for forming a wall or walls behind the air intake opening or openings to block the space between the pod and the lifting surface and thereby form a forwardly facing airscoop above the air intake opening or openings.

Preferably the space between the pod and the lifting surface is also partly enclosed by walls on each side of the air intake opening or openings. Such side walls may be retractable or may be fixed.

The invention is illustrated by the examples shown in the accompanying drawings. In the drawings:

FIGURE 3 is a plan of the pod, seen from the line III—III in FIGURE 1;

FIGURE 4 is a near-vertical section on the line IV—IV in FIGURE 2;

FIGURE 5 is a view, similar to FIGURE 4 showing one modification;

Figure 1:
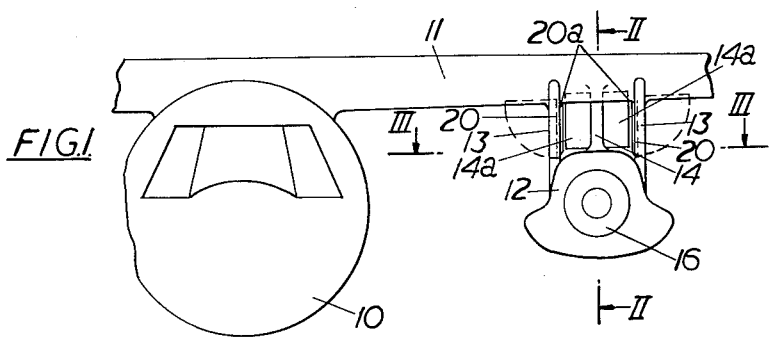
FIGURE 1 is a front view of part of an aeroplane showing a power plant pod slung below one of the wings.

The aeroplane shown in FIGURES 1 to 4 comprises a body 10 and a wing 11 which carries, on each side of the body, one or more pods 12 which are each slung below the wing on two forward struts 13 and one central rear strut 14.

The pod houses at its forward end a ducted fan turbojet engine 15 which receives air through a forwardly facing intake opening 16 and supplies fan discharge air and turbine exhaust gas to two swivelling nozzles 17 arranged one on each side of the pod. Behind the engine 15 are two further ducted fan turbojet engines 18 and 19 arranged with their axes in the same vertical plane as the axis of the engine 15, and inclined downwardly and to the rear at a small angle to the vertical. These engines receive air through intake openings 18a and 19a in the upper part of the surface of the pod 12 facing the underside of the wing 11 and discharge through openings 18b and 19b in the underneath surface of the pod so as to produce upwards thrust for vertical or short run take-off and landing. Each engine includes a fan 30, a high pressure compressor 31, a combustion system 32, a high pressure turbine 33, a low pressure turbine 34, and a by-pass duct 35. During normal wingborne forward flight the engines 18 and 19 are shut down and the intake openings 18a and 19a are closed by a sliding door. This door is indicated diagrammatically in FIGURE 2. It consists of two parts 21, 22 actuated by a cable drive 23 and a motor 23a. Starting from the open position, both doors move rearwards together until the front door 21 reaches the end of its travel, the last part of this travel causing both doors to rise so that the front door becomes flush with the exterior of the pod. The rear door 22 then continues rearwards, and finally also rises into flush position. A similar or other suitable door system (not shown) is provided for closing the discharge openings 18b and 19b.

When it is desired to restart the vertical lift engines 18 and 19 for landing, the difficulty is encountered that, the doors 21, 22 having been opened, the strong flow of air over the top of the pod hinders intake of air by the engines so that they are not easily started. It is to overcome this that, in accordance with the invention, an airscoop is provided. To constitute this, the rear strut 14 is provided with side fairing members 14a which are hinged to the strut at its trailing edge 14b and can be opened out as shown in FIGURE 3 by an actuator 32 to substantially close the rear end of the space between the pod and the wing. The sides of the space are furthermore substantially closed by a pair of flaps 20 which are hinged to the wing at 20a and can be swung upwards by actuators 24 to retract into housings 25 in the wing surface when not required.

When it is desired to start the vertical lift engines 18 and 19 in the air, the doors 21, 22 and the doors closing the discharge openings 18b and 19b are opened, the fairings 14a are opened out, constituting an air brake to slow the aircraft, and the flaps 20 are turned down to form with the fairings 14a and the under surface of the wing an airscoop directing air into the air intakes 18a and 19a of the engines, so that the latter are readily startable. When the engines have been started, the fairings and flaps may be retracted to allow a free flow of air to the engines from all sides.

Instead of the flaps folding upwardly and outwardly into separate wing housings they may fold inwardly into a common housing.

Furthermore, as shown in FIGURE 5, the flaps 120 may be hinged to the pod at 120a instead of to the wing, and form, in their retracted position A, overlapping closures for the air intake openings 18a and 19a. In this case, after the engines have been started, the flaps may be swung outwards from upright positions B to positions C approximately parallel to the plane of the wing so as to allow free flow of air to the engines 18 and 19 from both sides.

Figure 6:
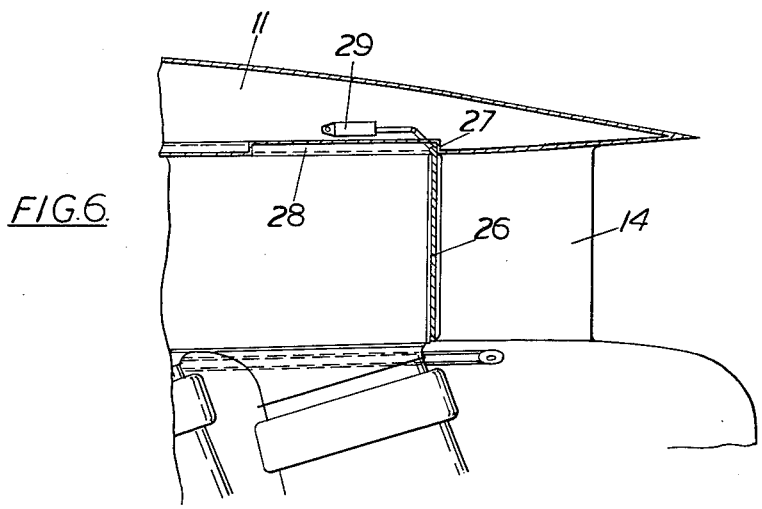
FIGURE 6 is a view, similar to part of FIGURE 2, showing a second modification.

Instead of strut fairings being used to form an end closure for the scoop, a flap hinged to the wing along a forward or rear spanwise axis and swinging downwards into proximity with the pod may be used for this purpose. FIGURE 6 shows a flap 26 hinged to the wing at 27. It can be swung forwards and upwards into a housing 28 by an actuator 29. A still further alternative is to rotate the rear strut 14 into a transverse position about a mid chord longitudinal axis.

Figure 7:
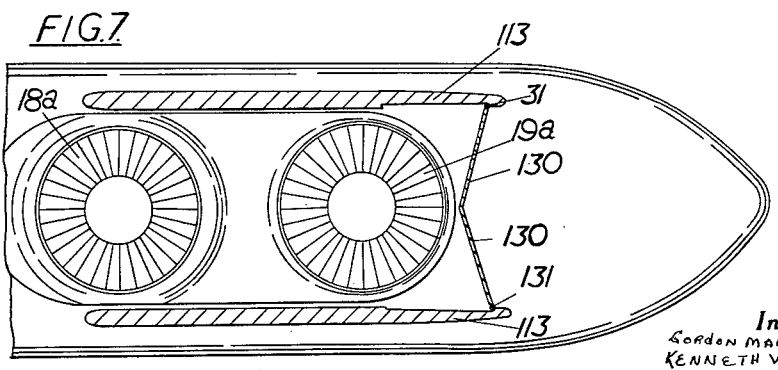
FIGURE 7 is a view, similar to part of FIGURE 3, showing a third modification.
Figure 2:
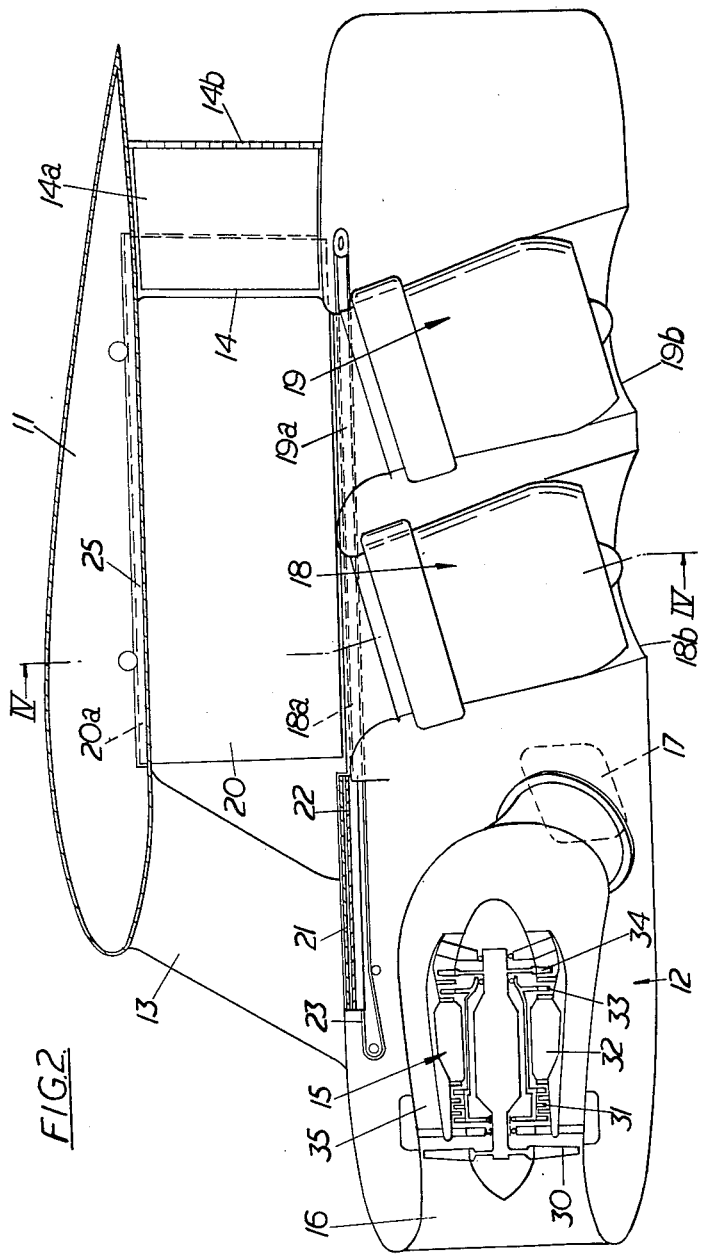
FIGURE 2 is a longitudinal section of the pod on a larger scale on the line II—II in FIGURE 1.

FIGURE 7 shows another arrangement in which there is a pair of support struts 113 placed on opposite sides of the lift engine air intakes, and of substantial fore-and-aft dimensions. This enables retractable flaps to form side members of the airscoop to be dispensed with. The rear parts 130 of the mutually facing side walls of the struts are hinged to the struts at their rear edges 131 and arranged to close together across the space between the struts, in the manner of lock gates, thus forming an air brake and an airscoop for starting the lift engines. After the engines have started, the flaps are opened and the engines draw air from the front and rear.

We claim:

1. An aeroplane comprising a lifting surface, an engine pod, means by which the pod is slung below the lifting surface, direct lift turbojet engine means housed within the pod end adapted for use during take-off and landing only, means defining at least one engine air intake opening in part of a surface of the pod facing the lifting surface, means, at least partly retractable, for forming at least one wall behind the air intake opening to block the space between the pod and the lifting surface and thereby form a forwardly facing airscoop above the air intake opening, a ducted fan additional turbojet engine within the forward end of the pod, and two swivelling nozzles arranged one on each side of the pod, the said additional engine being adapted to receive air through a forwardly facing intake opening and to supply fan discharge air and turbine exhaust gas to the nozzles.

2. An aeroplane comprising a lifting surface, an engine pod, means by which the pod is slung below the lifting surface, direct lift turbojet engine means housed within the pod and adapted for use during take-off and landing only, means defining at least one engine air intake opening in part of a surface of the pod facing the lifting surface, the means by which the pod is slung comprising two forward struts and one central strut in rear of the air intake opening or openings, and means, at least partly retractable, for forming at least one wall behind the air intake opening to block the space between the pod and the lifting surface and thereby form a forwardly facing airscoop above the air intake opening.

3. An aeroplane comprising a lifting surface, an engine pod, means by which the pod is slung below the lifting surface, direct lift turbojet engine means housed within the pod and adapted for use during take-off and landing only, means defining at least one engine air intake opening in part of a surface of the pod facing the lifting surface, the means by which the pod is slung comprising a pair of support struts placed on opposite sides of the lift engine air intakes, and of substantial fore-and-aft dimensions, and rear parts of the mutually facing side walls of the struts hinged to the struts at their rear edges and arranged to close together across the space between the struts to block the space between the pod and the lifting surface and thereby form a forwardly facing airscoop above the air intake opening.

4. An aeroplane according to claim 2 in which the rear strut is provided with side fairing members which are hinged to the strut at its trailing edge and can be opened out to substantially close the rear end of the space between the pod and the wing.

5. An aeroplane according to claim 2 including a flap hinged to the lifting surface along a spanwise axis to swing downwards into proximity with the pod in rear of the air intake opening or openings.

References Cited by the Examiner
UNITED STATES PATENTS

| | | | |
|---|---|---|---|
| 2,997,257 | 8/1961 | Kerry | 244—23 |
| 3,001,740 | 9/1961 | Montgomery | 244—12 |
| 3,066,889 | 12/1962 | Kelly | 244—12 |

MILTON BUCHLER, *Primary Examiner.*

L. C. HALL, *Assistant Examiner.*